May 26, 1959

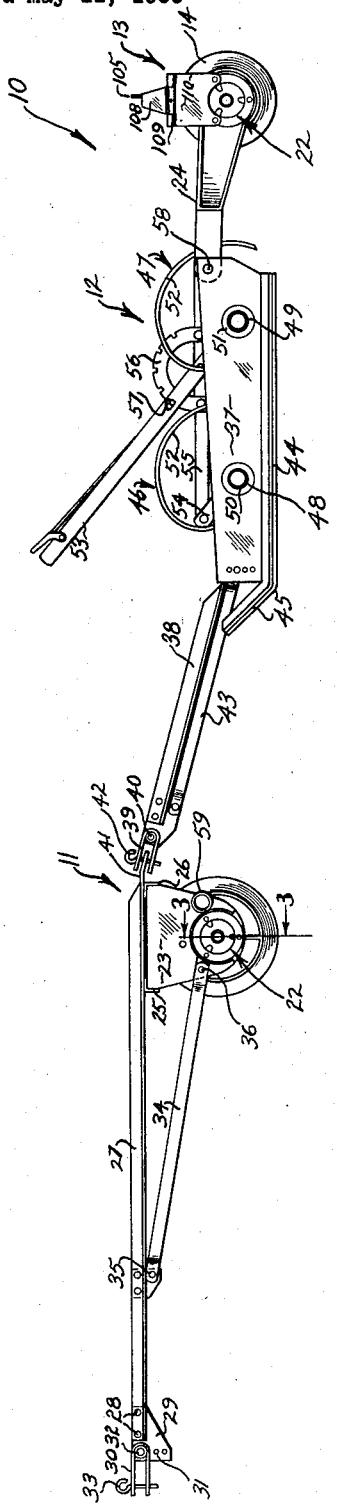

I. G. DUTCHER 2,888,085

TILLER-PACKER WITH TRANSPORT WHEELS

Filed May 11, 1955

INVENTOR.
IVAL G. DUTCHER
BY
Emerson B Donnell
ATTORNEY

May 26, 1959     I. G. DUTCHER     2,888,085
TILLER-PACKER WITH TRANSPORT WHEELS

Filed May 11, 1955     3 Sheets-Sheet 3

INVENTOR.
IVAL G. DUTCHER
BY
Emerson B Donnell
ATTORNEY

United States Patent Office 2,888,085
Patented May 26, 1959

2,888,085

TILLER-PACKER WITH TRANSPORT WHEELS

Ival G. Dutcher, Newton, Iowa, assignor to J. I. Case Company, Racine, Wis., a corporation of Wisconsin Application May 11, 1955, Serial No. 507,678

7 Claims. (Cl. 172—240)

The present invention relates to farm implements and more specifically to a tiller-packer implement of the type which is capable of preparing a seed bed in one operation.

The primary object of the present invention is to generally improve the operation and construction of implements of this general type.

A further object of the present invention is to provide novel means for supporting an implement of this type on transport wheels for highway travel.

Another object of the present invention is to provide transport wheels for movably supporting the front packer unit of an implement of this type, the wheel axles being effective for supporting the rear packer unit in raised position while being held thereby against displacement relative to the front packer unit.

Still another object of the present invention is to provide ball and socket housings for rotatably supporting the ground working tool axles in anti-friction bearings.

Yet a further object of the present invention is to provide means for supporting the ground working tool axles in anti-friction bearings while still permitting alignment and free-floating action for said axles.

Other objects and advantages of the present invention will be apparent in the following description and claims, considered together with the accompanying drawings in which:

Fig. 1 is a side elevational view of a tiller-packer implement embodying the principles of the present invention and shown in working position.

Fig. 2 is a view similar to Fig. 1 showing the implement in transport position, with parts broken away.

Figure 3:
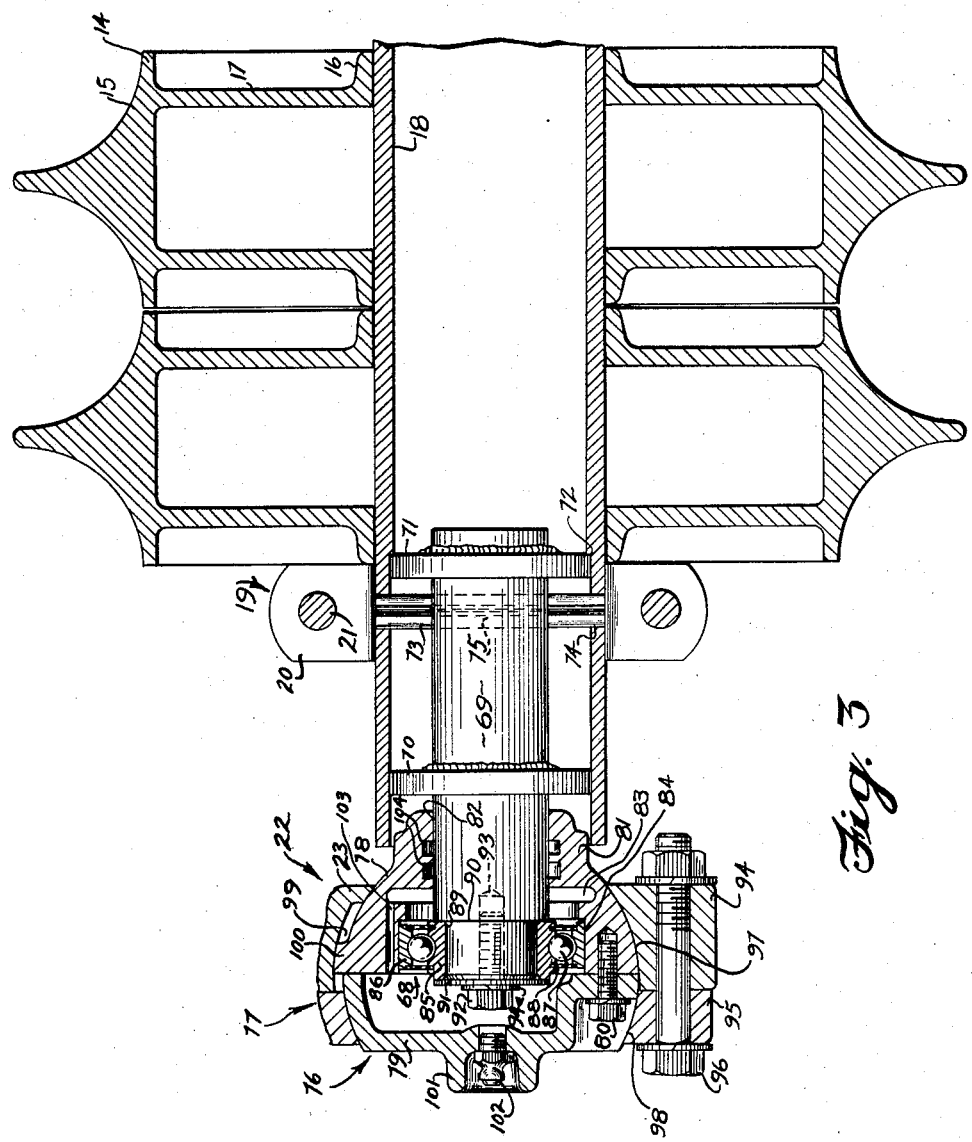
Fig. 3 is a vertical sectional view taken on the line 3—3 of Fig. 1 with parts broken away and slightly enlarged.

Referring now particularly to Fig. 1 of the drawings, number 10 designates an agricultural implement of the type commonly referred to as a tiller-packer, which implement consists of a front packer unit broadly designated by the number 11, a spring tooth harrow, broadly designated by the number 12, and a rear packer unit, broadly designated by the number 13. As will be more fully appreciated hereinafter, an implement of this general type is very versatile in use and in addition to its use as a unitary implement as shown in Fig. 1, a single packer implement is provided by using only the front packer unit 11, a double packer can be had by using the front and rear packer units 11 and 13, a spring tooth harrow is available by using that section 12, the front packer unit 11 and the spring tooth harrow 12 can be worked as a unit, or the spring tooth harrow 12 and the rear packer unit 13 can be worked as a single unit.

Referring now particularly to the specific construction of the individual units making up this implement, the front packer unit 11 and the rear packer unit 13 each comprise a plurality of pulverizer discs or rings 14 which are preferably produced from cast iron or steel. The discs 14 associated with packer unit 11 are identical in construction to the discs associated with packer unit 13 except that they are preferably larger in diameter, and as shown in Fig. 3, each of the discs 14 has a peripheral ring section 15 which is generally V-shaped in cross section and a plurality of hub rings 16 which are interconnected to the peripheral ring section 15 by interconnecting webs 17. The discs are so engineered as to crush and pulverize lumps and clods as the implement is moved over a field to be tilled, and the discs of front packer unit 11 and the rear packer unit 13 are each mounted or arranged in end to end relationship on a pipe axle 18. Displacement of the discs on pipe axle 18 is prevented by clamp collars 19 fixed to the pipe adjacent each of the end discs. Each of the collars 19 consists of a pair of opposed clamp elements 20 which are shaped so as to fit against its pipe axle and a pair of bolts 21 clamping the elements securely thereto.

The pipe axle 18 of each of the packer units is rotatably secured in a ball and socket housing 22 at its opposite ends as will be described in detail hereinafter. It will be appreciated, however, that the hub rings 16 of each of the discs are plain and not otherwise locked to their respective axle so as to turn therewith. In straight line travel, however, the resistance of one of the discs against turning relative to its adjacent discs and relative to its associated pipe axle is sufficient to cause all the discs to turn with its respective axle. When the implement is negotiating a turn, the individual discs can overcome this resistance and can turn relative to their adjacent discs and relative to its associated axle.

The ball and socket housings 22 associated with front packer unit 11 are identical in construction to the ball and socket housings associated with the rear packer unit 13 except that each of the front packer housings has a part thereof in the form of an upstanding end bracket 23 whereas the corresponding part in each of the rear packer unit housings is in the form of a forwardly extending draft arm 24.

Each of the brackets 23 is interconnected by front and rear rigid frame members 25 and 26 respectively and a forward extending draft bar 27 is suitably fixed to the frame members 25 and 26 and carries by bolts 28 a clevis plate 29 adjacent its forward end. The clevis plate selectively carries a suitable clevis 30 in a plurality of openings 31 by means of a bolt 32 and a draft pin 33 is provided for draft connecting the implement to a propelling vehicle in a well-known manner. The draft bar 27 is braced by angled frame members 34 only one of which is visible, fixed by bolts 35 and 36 to the draft bar and end brackets 23 respectively.

The spring tooth harrow 12 comprises two transversely spaced frame ends 37, only one of which is visible, which are suitably interconnected in spaced apart relationship by means of a cross bracket not visible and constituting no part of the present invention. A draft bar 38 is rigidly fixed to the cross bracket and extends forwardly therefrom and carries adjacent its forward end a clevis 39 by a bolt 40. The draft bar 27 has a rearwardly extending tongue 41 and clevis 39 can be draft connected to tongue 41 by a draft pin 42. The draft bar 38 is likewise suitably braced by angled brace members 43, only one of which is visible.

Each of the frame ends 37 has secured as by welding to the lower edge thereof a runner skid 44 which has an upwardly inclined front section 45 for permitting the harrow to be easily dragged upon the ground.

Two gangs of spring type harrow teeth indicated generally as 46 and 47 are mounted respectively on a pair of shafts 48 and 49 which in turn are rotatably mounted in transverse substantially parallel relationship in bearings 50 and 51 carried by the frame ends 37. The individual spring teeth 52 and the mounting therefor may be well known in the art and all of the teeth of each gang are attached to turn with their respective shaft so as to move from their working position to their nonworking or transport position.

For turning the shafts in unison any suitable or well-known mechanism can be employed such as for instance a control lever 53 which is rigidly connected to shaft 49 and a short lever arm 54 which is rigidly connected to shaft 48, the control lever and arm being connected by a bar 55 upon which is secured a toothed sector 56. A dog 57 is operatively movable in a well-known manner to engage one of the teeth of sector 56 so that the control lever 53 may be rocked about the axis of shaft 48 to turn that shaft and effect a corresponding turning motion to shaft 49 in a well-known manner.

Each of the draft arms 24 of the rear packer unit 13 can be draft connected to the respective frame ends 37 of the harrow 12 by a suitable pin 58 and the interconnection of each of the implement units is such as to permit the harrow 12 and the rear packer unit 13 to float relative to the front packer unit 11 and relative to each other sufficiently to compensate for normal unevenness of terrain.

Figure 5:
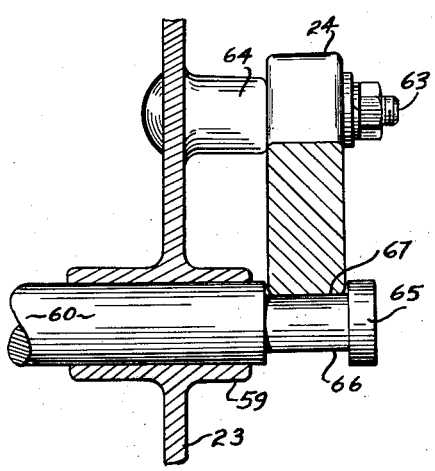
Fig. 5 is a vertical sectional view taken on the line 5—5 of Fig. 2, slightly enlarged, and with parts removed.

For providing a convenient method of transportation on highways each of the end brackets 23 is provided with a transversely extending bearing sleeve portion 59 and an axle 60 of a suitable transport wheel 61 can be easily inserted in or removed from its respective sleeve, see Fig. 5. To move the implement into transport position as shown in Fig. 2, the spring tooth harrow 12 is unhitched from the front harrow unit 11 and positioned on top of the end brackets 23 and secured in place by one bolt 62 on each side through the runner skids 44 of the end frames 37 and the end brackets. The draft bar 38 extends forwardly and is supported on the top of draft bar 27. The rear packer unit 13 is disconnected from the end frames 37 of the harrow and each of the draft arms 24 is swingably connected to the front packer unit by means of a bolt 63 which is received in an apertured spacer 64 formed on each of the end brackets 23. The front packer unit must then be raised a distance sufficient to permit the axle 60 of each of the transport wheels 61 to be inserted in the sleeve 59 of each of the end brackets 23. It will be noted that the axle of each of the transport wheels 61 is formed of a length sufficient to permit a portion thereof 65 to extend beyond the inner end of its sleeve 59. This portion of the wheel axle of each of the transport wheels has a depression 66 formed therein and before the wheel axle is pushed completely through its associated sleeve 59, the rear packer unit is swung upwardly a distance sufficient to permit this end of each of the axles 60 to pass across the underside of its adjacent draft arm 24 so as to intersect its path of travel. After each of the wheel axles 60 has been moved into position and the rear packer unit 13 allowed to swing downwardly, a bearing surface 67 of adjacent draft arm 24 will move into contact with the circumferential surface of depression 66 of each of the axles. The weight of the rear packer unit 13 against the wheel axles tends to hold the same against axial displacement out of the sleeves 59 while the wheel axles act as supports for holding the rear packer unit in elevated position with respect to the ground or highway.

To move the implement back into its working position, as shown in Fig. 1, requires merely a reversal of these operations.

As previously suggested, the axle 18 of each of the front and rear packer units 11 and 13 is rotatably supported at its opposite ends in ball and socket housings 22, each of these housings being identical in construction except for the shape of end brackets 23 and draft arms 24.

Referring particularly to Fig. 3 of the drawings, axle 18 is rotatably carried in a self-aligning anti-friction bearing 68 by means of a stub shaft 69. Stub shaft 69 has welded thereto a pair of spacer rings 70 and 71 for centering the stub shaft in substantially co-axial relationship with axle 18 and is received in the axle a distance sufficient to locate spacer 71 against a shoulder 72. A roll pin 73 is received in aligned openings 74 formed in axle 18 and in an opening 75 formed in stub shaft 69 for rotatably locking axle 18 to stub shaft 69. It will be noted that collar 19 is positioned over openings 74 so as to prevent accidental displacement of pin 73 therefrom.

The ball-and-socket housing 22 includes a bearing housing 76 which is generally ball-like in configuration and a socket housing 77 which receives and entraps the bearing housing. The bearing housing 76 is of two-piece construction having a cup element 78 and a cap element 79 secured together by a plurality of circumferentially spaced studs 80. The cup element has a hub portion 81 which is provided with an opening 82 for rotatably receiving stub shaft 69 and the substantially hollow interior is provided with a lubricant reservoir 83 and an adjacent bearing seat 84 which is substantially co-axial with stub shaft 69.

Bearing 68 is of any suitable or well-known construction including an inner race 85, an outer race 86, anti-friction elements in the form of balls 87, and suitable end seals 88. The inner race 85 is carried on a seat 89 formed on the outer end of stub shaft 69 and located between a shoulder 90 and a washer 91. The washer 91 is urged against the inner race by a stud 92 threadedly received in an opening 93 formed axially in stub shaft 69 and a lock washer 94a. The outer race 86 is located on seat 84 so that stub shaft 69 is rotatably carried by bearing 68 in bearing housing 76.

The socket housing 77 is also of two-piece construction and includes a housing element 94 and a retainer ring 95 which are secured together by circumferentially spaced bolts 96. Each element 94 and ring 95 has an opening 97 and 98 respectively formed therein and the peripheral surface defining each of these openings is so formed as to entrap the bearing housing 76 in socket housing 77.

The peripheral surface defining opening 97 has a recess or groove 99 formed therein positioned substantially in the plane of the axis of shaft 69, whereas cup element 78 has a key or boss 100 formed thereon which is received in groove 99 to prevent actual rotation of bearing housing 76 in socket housing 77 but to otherwise allow the bearing housing to float therein in the direction of the groove. The elements 94 of housings 22 of the front packer unit are in the form of end brackets 23 and in the form of draft arms 24 in the housings 22 of the rear packer unit. It will be appreciated therefore that the floating action of the bearing housings in their socket housings permits straight alignment of the axle 18 of the front packer unit and free floating action of the axle 18 of the rear packer unit.

The cap element 79 has a ring portion 101 formed thereon which protects a grease fitting 102 opening into the interior of cap 79. The lubricant reservoir 83 is interconnected with the interior of cap 79 by a port 103 so the lubricant flows or circulates past bearing 68 by way of port 103 into reservoir 83 and then upon the bearing surface of opening 82 and out the end thereof so as to flush away any dirt which might tend to enter the bearing housing. It will be noted that the bearing surface of opening 82 has spaced grooves 104 formed thereon which function as effective dirt seals when filled with lubricant.

Figure 4:
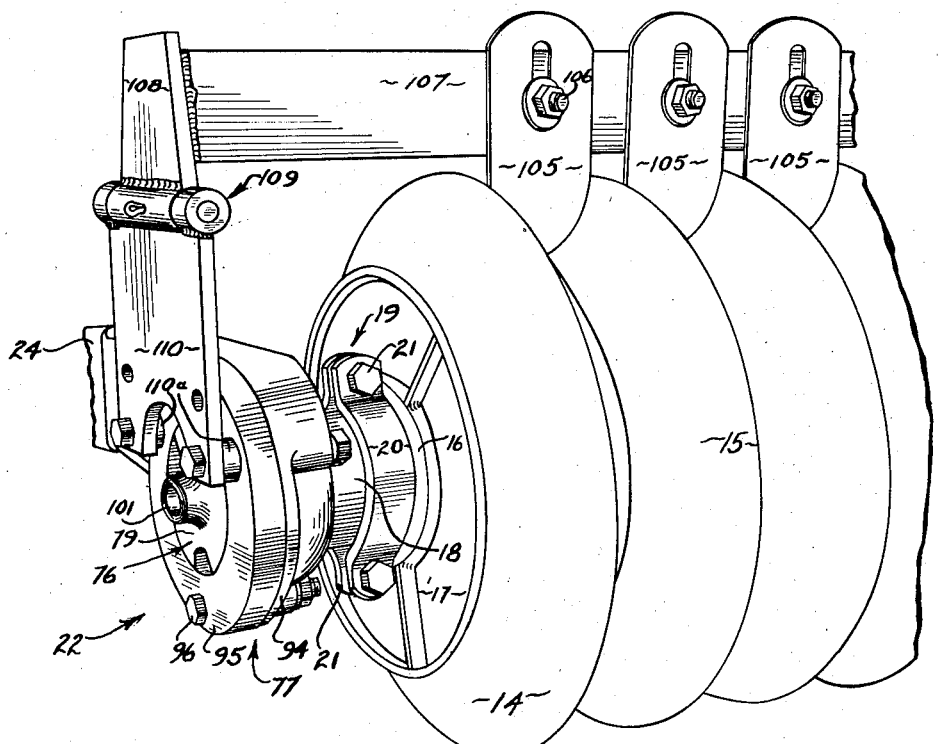
Fig. 4 is a perspective view taken from the left rear of the implement shown in Fig. 1 showing a portion of the rear packer unit, slightly enlarged.

As most clearly shown in Fig. 4, scrapers 105 are positioned between adjacent discs 14 of rear packer unit 11 for well-known purposes and each of these scrapers is selectively secured by means of a bolt 106 to a cross bar 107. Cross bar 107 has fixed as by welding to its opposite ends an end plate 108, each of which is hingedly connected at 109 to a standard 110. Each of the standards 110 is secured by a pair of the bolts 96 to the retainer ring 95 and spaced from the outer face thereof by suitable washers 110a.

From the foregoing description, it will be readily seen that there has been produced such a device as substantially fulfills the objects of the invention. While this description sets forth in detail the present and preferred construction of such a device, still in practice, such deviations from such detail may be resorted to as do not form a departure from the spirit of the invention as defined by the appended claims.

What is claimed is:

1. In a ground pulverizing implement, comprising a pair of transversely spaced end brackets, an axle rotatably mounted between said end brackets, and a plurality of ground working tools mounted on the axle for rotation therewith in straight line travel and for independent rotation when said implement is negotiating a turn, means for supporting said implement in transport position comprising a pair of transport wheels, a wheel axle associated with each of said wheels for rotatably supporting the same, each of said end brackets having formed therein a transversely extending opening for receiving a wheel axle for movably supporting said implement, a portion of each of said wheel axles extending inwardly beyond the thickness of its associated end bracket adjacent said openings, and a weight swingably mounted on each of said end brackets and supported in raised position by said portion of said wheel axles for holding the same against displacement out of said end brackets.

2. In a ground pulverizing packer implement, comprising a pair of transversely spaced end brackets, an axle rotatably mounted between said end brackets, and a plurality of pulverizing discs mounted on the axle for rotation therewith in straight line travel and for independent rotation when said implement is negotiating a turn, means for supporting said implement in transport position comprising a pair of transport wheels, a wheel axle associated with each of said wheels for rotatably supporting the same, each of said end brackets having formed therein a transversely extending sleeve for receiving a wheel axle for movably supporting said implement, a portion of each of said wheel axles extending inwardly beyond the inner end of its associated sleeve and having formed thereon a recess and a weight swingably mounted on each of said end brackets and supported in raised position in the recesses of said portions of said wheel axles for holding the same against displacement out of said end brackets.

3. A double packer pulverizer implement comprising a front packer having a pair of transversely spaced end brackets, a rear packer having a pair of transversely spaced end brackets including draft arm portions, means for swingably connecting said draft arms to the first-mentioned end brackets for up and down swinging movement adjacent the inner faces of said first-mentioned end brackets, an axle rotatably mounted between each pair of said end brackets, and a plurality of pulverizing discs mounted on each of the axles for rotation therewith in straight line travel and for independent rotation when said implement is negotiating a turn, means for supporting said implement in transport position comprising a pair of transport wheels, a wheel axle associated with each of said transport wheels for rotatably supporting the same, each of said first-mentioned end brackets having formed therein a transversely extending opening for receiving therein a wheel axle for movably supporting said implement on said wheels, a portion of each of said wheel axles extending inwardly beyond the thickness of its associated first-mentioned end bracket adjacent said openings a distance sufficient to intersect the path of travel of said draft arms, said rear packer unit being swung upwardly a distance sufficient to be urged downwardly against said portions of said wheel axles for supporting the rear packer in raised position and for holding said wheel axles against displacement out of said first-mentioned end bracket.

4. A double packer pulverizer implement comprising a front packer having a pair of transversely spaced end brackets, a rear packer having a pair of transversely spaced end brackets including draft arm portions, means for swingably connecting said draft arms to the first-mentioned end brackets for up and down swinging movement adjacent the inner face of said first-mentioned end brackets, an axle rotatably mounted between each pair of said end brackets, and a plurality of pulverizing discs mounted on each of the axles for rotation therewith in straight line travel and for independent rotation when said implement is negotiating a turn, means for supporting said implement in transport position comprising a pair of transport wheels, a wheel axle associated with each of said transport wheels for rotatably supporting the same, each of said first-mentioned end brackets having formed therein a transversely extending sleeve for receiving therein a wheel axle for movably supporting said implement on said wheels, a portion of each of said wheel axles extending inwardly beyond the inner end of its associated sleeve a distance sufficient to intersect the path of travel of said draft arms, each of said portions having formed thereon a recess, said rear packer unit being swung upwardly a distance sufficient to be urged downwardly into said recess of each of said portions for supporting the rear packer in raised position relative to the ground and for holding said wheel axles against displacement out of said sleeves.

5. A tiller-packer implement comprising a front packer having a pair of transversely spaced end brackets, a rear packer having a pair of transversely spaced end brackets including draft arm portions, an axle rotatably mounted between each pair of said end brackets, a plurality of pulverizing discs mounted on each of the axles for rotation therewith in straight line travel and for independent rotation when said implement is negotiating a turn, a harrow having transversely spaced end frames, tillage tools carried between said end frames, means for supporting said implement in transport position comprising means for securing said end frames to the first-mentioned end brackets for holding said harrow on top of said front packer, means for swingably connecting said draft arms to said first mentioned end brackets for up and down swinging movement adjacent the inner face of said first-mentioned end brackets, said first-mentioned end brackets having formed therein transversely extending openings, a pair of transport wheels, and a wheel axle associated with each of said transport wheels for rotatably supporting the same, said wheel axles being received in said openings for movably supporting said implement in raised position, a portion of each of said wheel axles extending inwardly a distance sufficient to intersect the path of travel of said draft arms, said rear packer unit being swung upwardly a distance sufficient to cause said draft arms to be urged downwardly against said portions of said wheel axles for supporting the rear packer in raised position relative to the ground while holding said wheel axles against displacement out of said first-mentioned end brackets.

6. A tiller-packer implement comprising a front packer having a pair of transversely spaced end brackets, a rear packer having a pair of transversely spaced end brackets including draft arm portions, an axle rotatably mounted between each pair of said end brackets, a plurality of pulverizing discs mounted on each of the axles for rotation therewith in straight line travel and for independent rotation when said implement is negotiating a turn, a harrow having transversely spaced end frames, tillage tools carried between said end frames, means for supporting said implement in transport position comprising means for securing said end frames to the first-mentioned end brackets for securing said harrow on top of said front packer, means for swingably connecting said draft arms to said first-mentioned end brackets, said first-mentioned end brackets having formed therein transversely extending sleeves, a pair of transport wheels, a wheel axle associated with each of said transport wheels for rotatably supporting the same, said wheel axles being received in said sleeves for movably supporting said implement in raised position, a portion of each of said wheel axles extending inwardly a distance sufficient to intersect the path of travel of said draft arms, said portion having a recess formed thereon, said rear packer unit being swung upwardly a distance sufficient to cause said draft arms to be urged downwardly into the recesses of each of said portions for supporting the rear packer in raised position relative to the ground while holding said wheel axles against displacement out of said sleeves.

7. A tiller-packer implement comprising a front packer having a pair of transversely spaced end brackets, a rear packer having a pair of transversely spaced end brackets including draft arm portions, an axle rotatably mounted between each pair of said end brackets, a plurality of pulverizing discs mounted on each of the axles for rotation therewith in straight line travel and for independent rotation when said implement is negotiating a turn, a harrow having transversely spaced end frames, tillage tools carried between said end frames, means for supporting said implement in transport position comprising means for securing said end frames to the first-mentioned end brackets for securing said harrow on top of said front packer, means for swingably connecting said draft arms to said first mentioned end brackets for up and down swinging movement adjacent the inner faces of said first-mentioned end brackets, said first-mentioned end brackets having formed therein transversely extending aligned sleeves, a pair of transport wheels, a wheel axle associated with each of said transport wheels for rotatably supporting the same, said wheel axles being received in said sleeves for movably supporting said implement in raised position, a portion of each of said wheel axles extending inwardly a distance sufficient to intersect the path of travel of said draft arms, said rear packer unit being swung upwardly a distance sufficient to cause said draft arms to be urged downwardly against said portions of said wheel axles for supporting the rear packer in raised position relative to the ground, said portions being shaped so as to be held against displacement out of said first-mentioned end brackets by said draft arms.

References Cited in the file of this patent
UNITED STATES PATENTS

| | | |
|---|---|---|
| 407,463 | Ansley et al. | July 23, 1889 |
| 948,854 | Groves | Feb. 8, 1910 |
| 966,890 | Donnelly | Aug. 9, 1910 |
| 1,373,815 | Holly | Apr. 5, 1921 |
| 1,844,519 | Newill | Feb. 9, 1932 |
| 2,248,069 | Domries | July 8, 1941 |
| 2,586,490 | Thompson | Feb. 19, 1952 |